June 21, 1949.  E. A. DOMKE  2,473,868
LOAD SUPPORTING ROLLER
Filed June 12, 1947
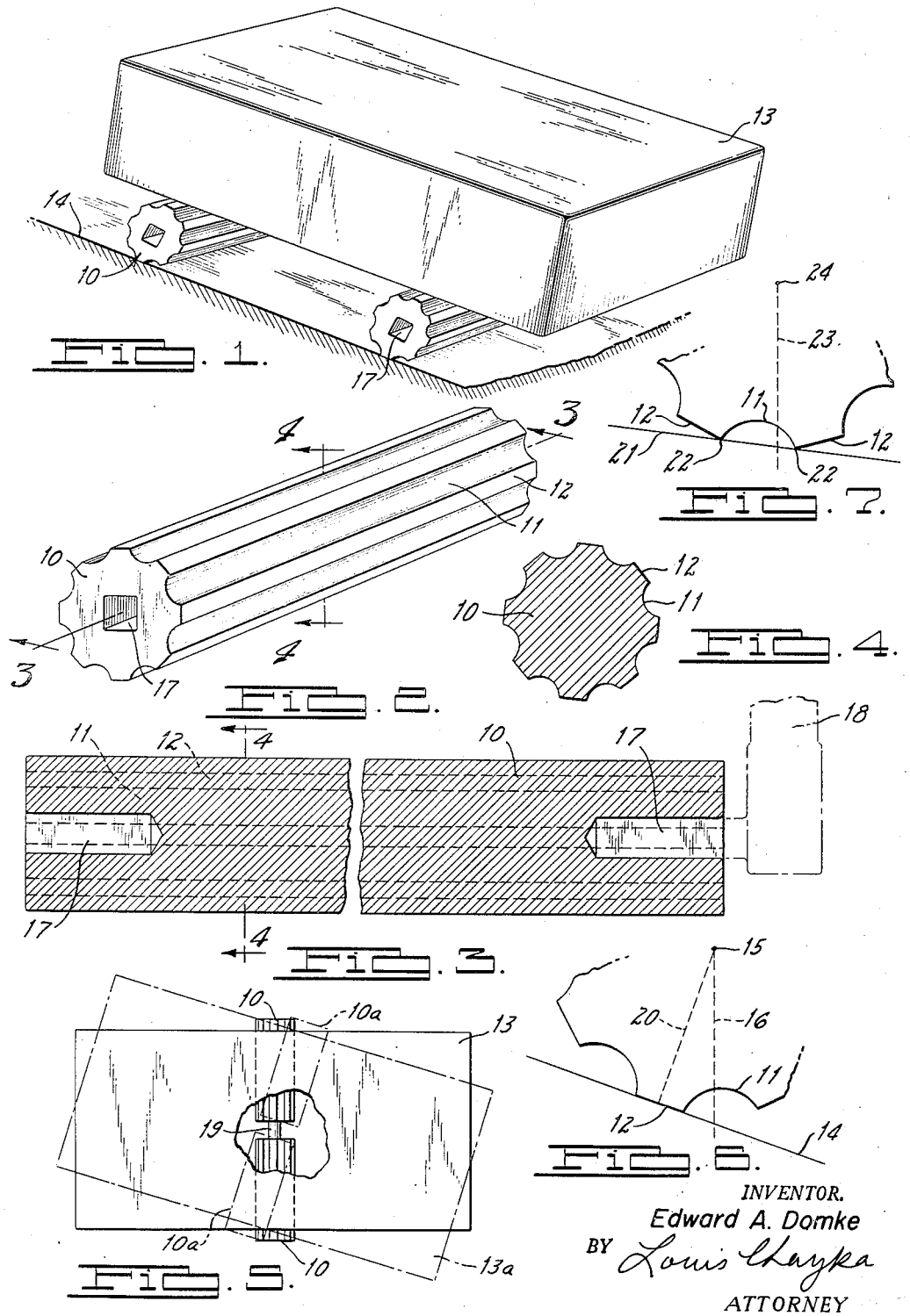
INVENTOR.
Edward A. Domke
BY Louis Chayka
ATTORNEY Patented June 21, 1949

2,473,868

UNITED STATES PATENT OFFICE 2,473,868

LOAD SUPPORTING ROLLER

Edward A. Domke, Ann Arbor, Mich., assignor of twenty-four per cent to Leonard E. Riemer and twenty-four per cent to Stephen L. Piatkowski, both of Ann Arbor, and twenty-four per cent to Howard E. Logan, East Ann Arbor, Mich.

Application June 12, 1947, Serial No. 754,310

2 Claims. (Cl. 280—3)

My improvement pertains to load supporting rollers employed for the purpose of moving heavy objects such as heavy crates, machinery, buildings, etc., from one placement or position to another. The object of my improvement is to provide a roller which by virtue of its design will be capable of being used on inclines without the danger of rolling back under the weight imposed thereupon. Specifically the object of my invention is to provide such a roller without the need of employing ratchet mechanism or any locking device in combination with my said rollers.

I have accomplished my object in a novel manner, the novelty lying primarily in the design of the roller which includes certain novel features. These will be set forth in the accompanying drawings in which:

Figure 1 is a perspective view of a pair of my rollers with a load resting thereon, the rollers being shown disposed on an incline;

Figure 2 is an enlarged perspective view of one of my rollers;

Figure 3 is an enlarged sectional view on line 3—3 of Figure 2;

Figure 4 is a sectional view of one of my rollers on line 4—4 of Figure 3;

Figure 5 is a plan view of a load supported on a pair of my axially alined rollers;

Figure 6 is a diagrammatic presentation of the position of a roller on an incline;

Figure 7 is a diagrammatic presentation of another position of the roller on an incline.

Similar numerals refer to similar parts throughout the several views.

The roller of my invention, generally indicated by numeral 10, is made of a suitable, preferably ferrous material. It is made substantially in the form of an oblong cylinder having on its surface a plurality of spaced flutes 11 extending in the direction of the axis of the roller, but having the surfaces between the respective flutes defined by flat areas or faces 12. Because of said flat faces the roller may be also described as being made in the form of a polygonal prism, containing enough individual side walls to give it a resemblance to a cylinder but having said flat faces alternating with concave grooves, each groove being disposed between two adjoining flat face areas.

It is by reason of said flat faces that the roller sustaining a load is in a frictional contact with the surface upon which it rests. The area of one of said flat faces on a roller or the areas of respective single faces, on a plurality of rollers if more than two are used, is normally large enough for a frictional contact with the supporting base to hold the load in place against rolling back. This is true even with respect to a roller or a plurality of them, when they are employed on an incline, and placed thereon laterally to the direction of the incline. This is shown in Figure 1 wherein the rollers are shown supporting a load 13..

It will be understood that the ability of the rollers to sustain a load against rolling back will depend upon the angle of the incline and the lateral dimensions of the respective flat faces of the roller. This is shown in the diagram in Figure 6, wherein numeral 14 shows the incline, 12 is the flat face of a roller, 15 is the center of the roller, numeral 16 indicates the line of gravity, while numeral 20 is a radius of a circle circumscribing the roller. Obviously the roller will remain in place without rolling back when the line of gravity will cross face 12. However, should the angle of incline cause the line of gravity to project beyond the lower end of face 12, the roller would tend to roll down the incline.

The roller will also remain in a stationary position on an incline without rolling back when it rests on edges 22 of the two faces 12, separated by a fluting 11. This is shown in Figure 7 wherein the incline is marked 21. Here, also, the degree of incline has a bearing on the stability of the roller, and it will be obvious that the roller will retain its stationary position when line 23 of gravity from the center of the roller at 24, will intersect the outline of the fluting between said edges as shown in Figure 7. Should said line of gravity, with the increase of the angle of incline, fall beyond the lower edge 22, the roller would tend to roll back down said incline.

In case it is desired to impart to the roller a rotary movement, upwardly, with respect to said incline, this may be effected by means of a suitable wrench, crank, or lever to be inserted axially into an angular aperture 17 at each end of the roller. A wrench 18 is indicated in dotted lines in Figure 4.

When combined in an axial relation to each other by means of a connecting shaft, the rollers fitting over said shaft from opposite ends, for rotation thereon, may be used for the purpose of turning the load carried thereon at an angle to its initial position. This is shown in Figure 5. As rollers 10 are connected by a shaft 19, and are capable of rotating thereon, the load 13 may be turned to position 13a by rotating one of the rollers alone, or by rotating the respective rollers in opposite directions. As a result of the lastnamed operation, the rollers would assume positions indicated by dotted lines 19a.

Having described the above roller, what I wish to claim is as follows:

1. A roller of the kind described and having the form substantially that of a polygonal prism including flat faces extending in the direction of the axis thereof but having between each two faces a fluting extending in the same direction, said roller having at each end an aperture for application of means for rotation of the roller around its axis.

2. A roller of the kind described having the form substantially that of a polygonal prism including a plurality of flat faces extending in the direction of the axis thereof each individual face being separated from adjoining faces by longitudinal grooves in the body of the prism, each groove being laterally of the same dimension as an individual face, said roller having at each end an aperture for application of tools to rotate the prism around its axis.

EDWARD A. DOMKE.

REFERENCES CITED

The following references are of record in the file of this patent:

UNITED STATES PATENTS

| Number | Name | Date |
| --- | --- | --- |
| D. 18,410 | Richards | June 26, 1888 |
| 141,653 | Luehmann et al. | Aug. 12, 1873 |
| 218,588 | Sperry | Aug. 12, 1879 |
| 847,579 | Jacobs | Mar. 19, 1907 |
| 2,003,213 | Minutillo | May 28, 1935 |
| 2,401,295 | Cones | June 4, 1946 |